March 19, 1957 B. S. SHELLHORN 2,786,134
SAMPLING CIRCUIT FOR FREQUENCY-SHIFT RECEIVER
HAVING AUTOMATIC FREQUENCY CONTROL
Filed Jan. 5, 1954
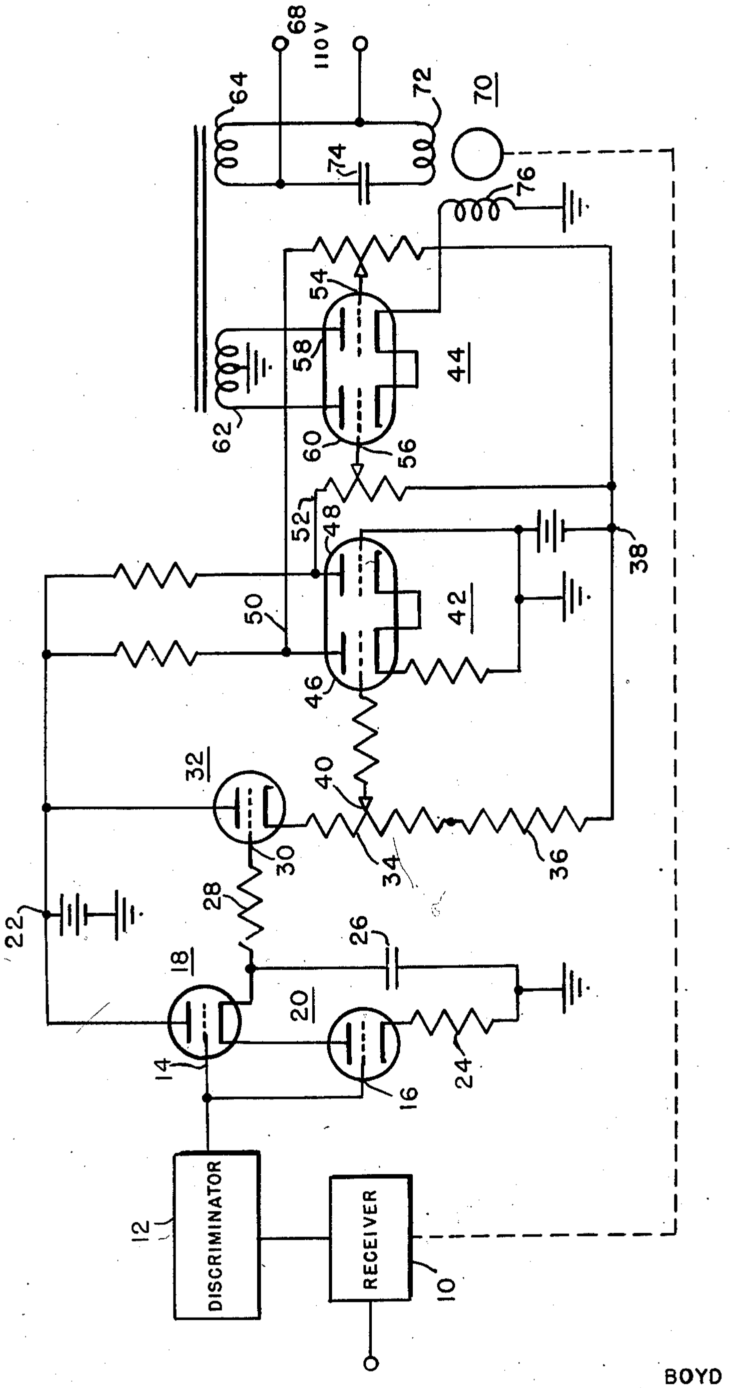
INVENTOR.
BOYD S. SHELLHORN
BY
Harry M. Saragovitz
ATTORNEY

United States Patent Office 2,786,134

Patented Mar. 19, 1957

2,786,134

SAMPLING CIRCUIT FOR FREQUENCY-SHIFT RECEIVER HAVING AUTOMATIC FREQUENCY CONTROL

Boyd S. Shellhorn, Red Bank, N. J., assignor to the United States of America as represented by the Secretary of the Army Application January 5, 1954, Serial No. 402,420

3 Claims. (Cl. 250—20)

(Granted under Title 35, U. S. Code (1952), sec. 266)

The invention described herein may be manufactured and used by or for the Government for governmental purposes, without the payment of any royalty thereon.

This invention relates to an automatic frequency control. More particularly this invention relates to a sampling circuit associated with a discriminator to detect frequency drift in a receiver for frequency control purposes.

When transmitting intelligence by frequency shift keying the signal code used to transmit the various characters is the stop-start, five unit code that consists of five selecting impulses used in various combinations of current and no current conditions. The conditions which cause current to flow are called mark impulses and those which cause no current to flow are called space impulses. The mark impulses are transmitted by having the carrier on one frequency while the space impulses are transmitted by having the carrier on another frequency. Thus the intelligence is transmitted by the simple expedient of having the carrier frequency shifted back and forth between two nearby frequencies in a sequence determined by the signalling code.

At the receiving station all the impulses are received by a conventional receiver tuned approximately between the two frequencies, and the intermediate frequency is therefore shifted according to the incoming frequency shift. This is detected and converted into positive voltage for mark impulses and negative voltage for space impulses. When the radio receiver is tuned precisely between the two frequencies the detecting device, which is usually in the form of a discriminator as used in frequency modulation, will produce voltages of equal but opposite polarities for the mark and space impulses.

Since it is virtually impossible to tune the receiving equipment or to maintain the transmitting equipment within close enough tolerances to maintain exactly equal discrimination between the two frequencies, unequal voltages usually develop tending towards distortions and errors in the received copy. If the differences between the voltages becomes more and more pronounced the detection deteriorates or fails completely when either the mark or the space voltage approaches zero.

Some kind of automatic frequency control is necessary to maintain a useable signal over varying conditions but the application of the conventional types of automatic frequency controls presents two problems. First, since the signal is being shifted between two predetermined frequencies any attempt to apply automatic frequency control would necessitate the elimination of one or the other of these through the use of highly selective filters. Secondly, the use of highly selective filters would make the automatic frequencies control system inoperative should a change in the amount of automatic frequency shift be desired.

This invention includes a circuit that samples the two signals, retains them for a relatively long time, and applies a correction voltage when the average of the sampling voltage drifts up or down.

It is therefore an object of this invention to provide an automatic frequency control circuit.

It is a further object of this invention to provide an automatic frequency control system for frequency modulated transmission where the frequency shift is between two extremes and the controlled frequency should have a definite relation between the two extremes.

It is a further object of this invention to provide a sampling circuit for establishing a mean value between peak voltages where the repetition of the peaks may not be a constant. Other and further objects of this invention will become apparent from the following specification and the drawing which shows a typical embodiment of this invention applied to a frequency control system.

Referring now more particularly to the drawing, the output of the receiver 10 which may be any type of tunable circuit applicable to frequency modulation is detected in discriminator 12 to provide an output of positive or negative voltage depending on the direction of frequency shift. The positive and negative pulses are applied simultaneously to the grids 14 and 16 of the vacuum tubes 18 and 20 which may be conventional triodes or halves of a dual triode or other equivalent control devices. The tubes 18 and 20 are connected in series from the source of positive voltage 22 to ground. The cathode of tube 18 is connected to the plate of tube 20. The plate of tube 18 is connected to the source of voltage 22 and the cathode of tube 20 is connected through a resistor 24 to ground. A condenser 26 is connected between the junction of tubes 18 and 20 to ground. Resistor 28 couples the output at the junction of tubes 18 and 20 to the grid 30 of tube 32 which again may be a triode or its equivalent. The plate of tube 32 is connected to the source of positive voltage 22 and the cathode of tube 32 is connected through potentiometer 34 and voltage dropping resistor 36 to a source of negative voltage 38. The contact 40 of the potentiometer is adjusted to equal ground potential. The output of 40 is connected to a phase inverter stage 42 directly coupled to motor reversing and driving circuits 44 to be discussed later. This is one application of the drift voltage or the voltage produced by the drifting frequency of the receiver 10 to various means for controlling the frequency of the receiver.

In operation a positive voltage from the discriminator 12 causes tube 18, as well as tube 20, to conduct. Tube 20 with a positive grid potential is in a saturated condition and provides in series with limiting resistor 24 a low impedance cathode load for tube 18 which acts as a cathode follower during the interval of the positive voltage from the discriminator. The low impedance of tube 20 will discharge condenser 26 if its voltage level is above that of grid 14. If the condenser voltage level is below that of grid 14, the cathode follower action of tube 18 will charge condenser 26 up to the grid voltage level thereby placing a charge on the condenser 26 which is in direct relation to the value determined by the circuit parameters and the discriminator voltage. Since the circuit parameters remain substantially constant the voltage across the condenser 26 will be a function of discriminator voltage. When a negative impulse is received from the discriminator 12 the grids of tubes 18 and 20 are driven beyond a cutoff value making their plate impedances infinite so that the condenser 26, having no relatively low impedance discharge path, maintains its voltage.

Condenser 26 should be a low-loss condenser to retain its charge a relatively long time. A duration of about 120 milliseconds is considered necessary for application in a frequency shift keying teletype circuit.

On receipt of another positive pulse, tubes 18 and 20 again start conducting and if there has been no change in the frequency and corresponding discriminator voltage the conductivity of the tubes will be the same as before and the voltage across condenser 26 will be unchanged. This voltage would have a practical value of 24 volts in frequency shift keying circuits; however, if a drift in frequency has occurred the discriminator voltage will be shifted either higher or lower and the tubes 18 and 20, which are again conducting, will charge the condenser 26 to the new value. Thus any change or deviation in the frequency transmission or reception will cause a change in the discriminator voltage which is detected and retained across condenser 26 to be applied to any desired form of frequency control unit.

A typical control unit may be actuated by a tube such as 32 whose voltage level is established by the potential across its grid 30. The potentiometer 34 has its movable arm adjusted to zero voltage initially so that any variation in the grid 30 causes a change in the potential of the adjusted arm 40 of potentiometer 34 with respect to ground. This voltage may be either positive or negative with respect to ground depending on the direction of frequency drift and the corresponding polarity of adjustment can be applied to the tuned circuit of receiver 10. If a new station with a different frequency shift were tuned in, the zero setting of the voltage at 40 with respect to ground should, of course, be reset.

In the typical frequency correction circuit shown here the positive or negative voltage at 40, resulting from the frequency drift in receiver 10, is applied to the phase inverter circuit 42 of a common cathode coupled type consisting of tubes 46 and 48 whose inverted outputs at plates 50 and 52 are coupled to the grids 54 and 56 of tubes 58 and 60 of circuit 44.

The plates of tubes 58 and 60 are connected directly to a source of alternating current 62 applying a positive voltage on one plate and a negative voltage on the other alternately. This voltage may be obtained from the source of alternating current 68 through transformer coil 64. The control motor 70 has one winding 72 which is connected to the source of alternating current 68 through phase shifting condenser 74. The amount and direction of current applied to the field coil 76 will be determined by which of the grids of tubes 58 and 60 is more positive, which in turn is established through phase inverter 42 by the direction of drift of the voltage at 40 determined by the direction of frequency shift in the receiver 10.

The circuits in the receiver 10 may be retuned by any of several well known types of mechanism coupled to the motor 70 which will rotate in the proper direction until the circuits are balanced. Having thus described my invention what is claimed is:

1. In combination with a tunable receiver for frequency modulated signals, a discriminator producing a voltage proportional to the modulation of said frequency modulated signals, a first and second vacuum tube having cathode, anode and grid electrodes, the grids of said first and second vacuum tubes connected directly together and to said discriminator, the cathode of said first tube connected to the anode of said second tube, a source of positive potential with respect to ground connected to the anode of said first tube, the cathode of said second tube being grounded, a condenser connected across one of said tubes to be charged to and retain the instantaneous value of the discriminator voltage, means responsive to variation in the charge across said condenser for tuning said receiver.

2. In a circuit as in claim 1, a third vacuum tube having cathode, anode and grid electrodes, a source of negative potential with respect to ground, a potentiometer connected between the cathode of said third vacuum tube and said source of negative potential, the anode of said third vacuum tube connected to the anode of said first vacuum tube, said variable potentiometer tap adjustable to ground potential, means for detecting variations in potential of said potentiometer tap with respect to ground, means actuated by said means for detecting variations in potential for tuning said frequency modulated receiver to compensate for variations in said voltage.

3. A circuit as in claim 2 wherein said means for detecting variations in potential of said potentiometer tap with respect to ground comprise a means for controlling a reversible alternating current motor whereby said motor rotates in a first direction when the voltage of said potentiometer tap is positive with respect to ground and in a second direction when the voltage of said potentiometer tap is negative with respect to ground, a mechanical tuning means for said receiver, said motor mechanically coupled to said tuning means to compensate for variations in the mean level of said discriminator voltage.

References Cited in the file of this patent

UNITED STATES PATENTS

| | | |
|---|---|---|
| 2,354,827 | Peterson | Aug. 1, 1944 |
| 2,446,705 | Hoeppner | Apr. 12, 1949 |
| 2,502,154 | Jeffers | Mar. 28, 1950 |
| 2,507,735 | Peterson | May 16, 1950 |
| 2,567,286 | Hugenholtz | Sept. 11, 1951 |
| 2,568,213 | Bath | Sept. 18, 1951 |